(12) United States Patent
Kubota et al.

(10) Patent No.: US 7,768,962 B2
(45) Date of Patent: Aug. 3, 2010

(54) HSUPA HARQ PROCESS FLUSHING

(75) Inventors: Keiichi Kubota, Kanagawa (JP);
Benoist Sebire, Tokyo (JP); Juho Pirskanen, Tampere (FI); Karri Ranta-Aho, Espoo (FI); Luis Miguel Santos Barreto, Surrey (GB); Michael Whitehead, Farnham (GB)

(73) Assignee: Nokia Corporation, Espoo (FI)

( * ) Notice: Subject to any disclaimer, the term of this patent is extended or adjusted under 35 U.S.C. 154(b) by 887 days.

(21) Appl. No.: 11/526,095

(22) Filed: Sep. 22, 2006

(65) Prior Publication Data

US 2007/0097937 A1 May 3, 2007

Related U.S. Application Data

(60) Provisional application No. 60/732,603, filed on Nov. 1, 2005.

(51) Int. Cl.
*H04W 4/00* (2009.01)
(52) U.S. Cl. .................. 370/328; 370/329; 370/310; 455/450
(58) Field of Classification Search .......... 370/295, 370/329, 335, 342, 310, 349, 229, 465, 236; 455/550.1, 556.2, 466, 424, 425, 41.2, 452.1–452.2, 455/450–451, 509
See application file for complete search history.

(56) References Cited

U.S. PATENT DOCUMENTS

2003/0065646 A1   4/2003   Joseph et al.
2003/0147370 A1*  8/2003   Wu ............................ 370/338
2003/0152031 A1*  8/2003   Toskala et al. .............. 370/236
2004/0047343 A1*  3/2004   Muniere ..................... 370/352
2004/0223507 A1* 11/2004   Kuchibhotla et al. ........ 370/428
2005/0122918 A1*  6/2005   Johnston .................... 370/310
2006/0182022 A1*  8/2006   Abedi ........................ 370/229
2006/0256745 A1  11/2006   Chao et al.
2007/0211663 A1*  9/2007   Jiang .......................... 370/329

OTHER PUBLICATIONS

3GPP TSG-RAN-WG2 Meeting #44, "HARQ protocol for HSUPA", Oct. 4-8, 2004 in Sophia Antipolis, France R2-042052, retrieved from the Internet: http://www.quintillion.co.jp/3GPP/TSG_RAN/ TSG_RAN_index_1.html, p. 2, line 3-line 17.
3GPP TSG-RAN-WG2 Meeting #49, "HARQ Process flushing", Seoul, South Korea, Nov. 7-11, 2005 R2-052991, retrieved from the Internet: http://www.quintillion.co.jp/3GPP/TSG_RAN/ TSG_RAN_index_1.html, Introduction; Discussion; Proposal.

* cited by examiner

*Primary Examiner*—Kamran Afshar
*Assistant Examiner*—Ezana Getachew
(74) *Attorney, Agent, or Firm*—Ware, Fressola, Van Der Sluys & Adolphson LLP

(57) ABSTRACT

A method and equipment by which a radio access network of a wireless network communicates to a user equipment wireless communication device an indication that the user equipment is to flush one or more send buffers. A flag is included in a message to indicate that the one or more send buffers are to be flushed. The message is for example a message indicating reconfiguration is to be performed, and the flag (if set) is to be interpreted by the user equipment as indicating that the one or more send buffers are to be flushed prior to performing the reconfiguration. A corresponding method and equipment for a user equipment wireless communication device are also provided.

19 Claims, 4 Drawing Sheets

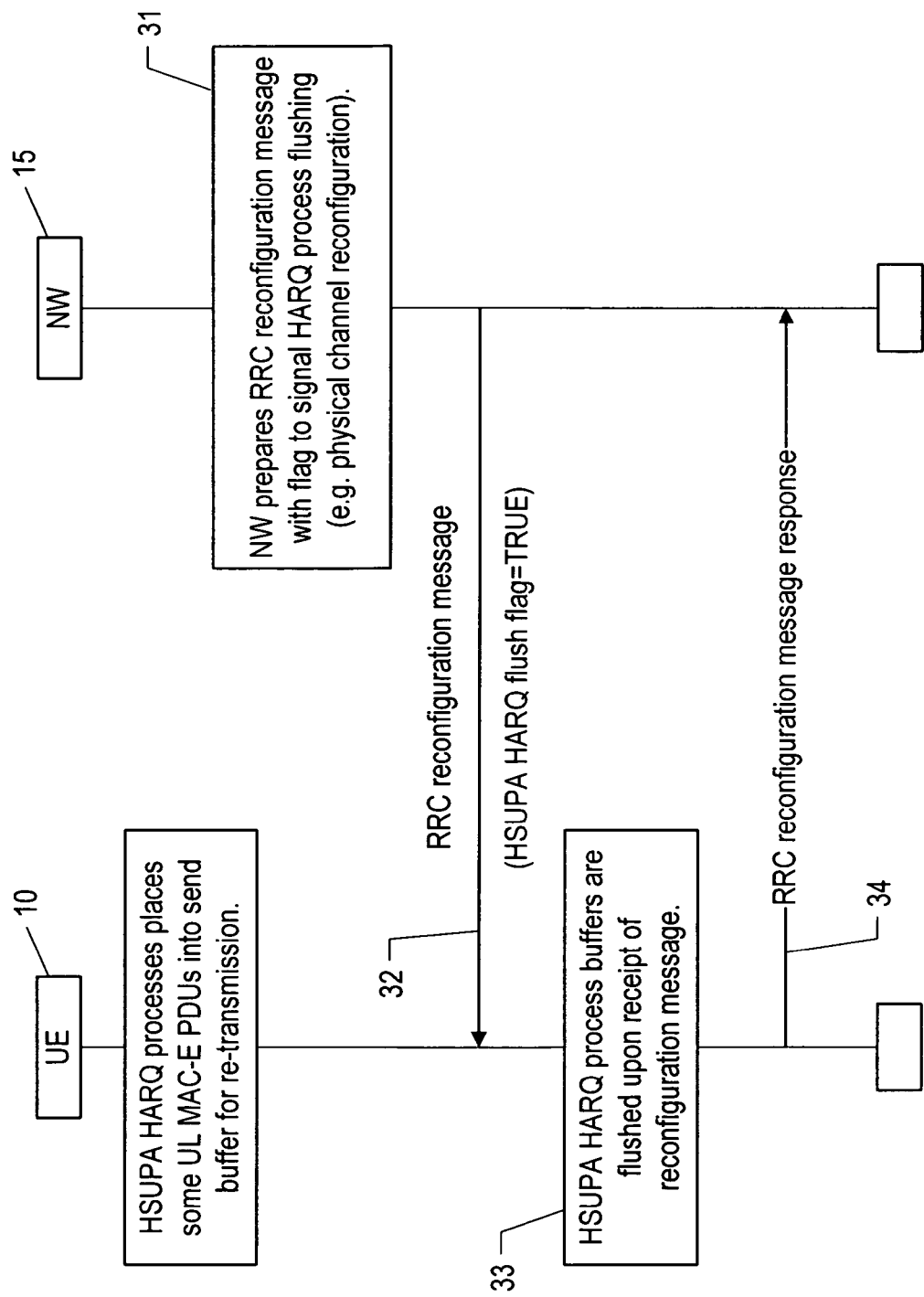

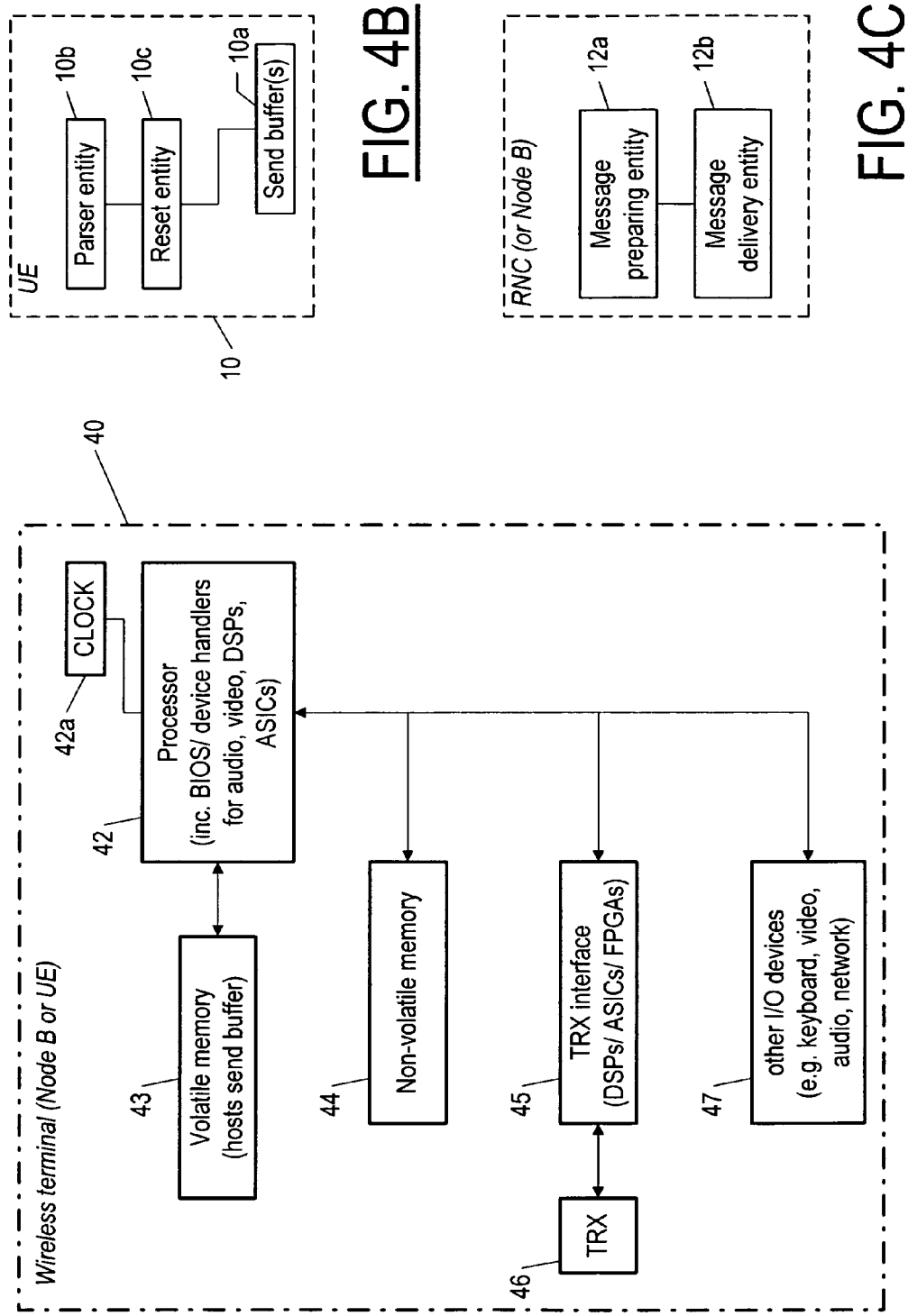

HSUPA HARQ PROCESS FLUSHING

CROSS-REFERENCE TO RELATED APPLICATIONS

Reference is made to and priority claimed from U.S. provisional application Ser. No. 60/732,603 filed Nov. 1, 2005.

BACKGROUND OF THE INVENTION

1. Technical Field

The present invention pertains to the field of wireless communication, especially via telecommunication networks according to 3GPP specifications. More particularly, the present invention is related to processes performed in connection with uplinking packets by a user equipment device to a radio access network per high speed uplink packet access (HSUPA), and even more particularly, to hybrid automatic repeat request (HARQ) flushing by a user equipment device.

2. Discussion of Related Art

The present invention concerns flushing a buffer used by a user equipment (UE) device, i.e. a wireless terminal used by a user, for HARQ processes in connection with so-called high speed uplink packet access (HSUPA) used with the radio access network of UMTS (Universal Mobile Telecommunications System), i.e. the so-called UMTS terrestrial radio access network (UTRAN). A UE device includes a so-called mobile terminal component for communicating with a UTRAN. (A UE device could be a so-called mobile station or cellular telephone, but could also be for example a computer including the mobile terminal component.)

Per 3GPP ($3^{rd}$ Generation Partnership Program, a consortium of wireless telecommunication companies), any UTRAN includes typically several radio network controllers (RNCs), each controlling several so-called Node Bs—also known as base stations. A UE device, such as a mobile phone, is allowed to uplink up to, but not exceeding, a maximum allowable rate or power that is communicated to the UE device by the Node B serving the UE device (a.k.a. the serving Node B). The UE holds the data (packets) for uplink in a send buffer until the packets are successfully communicated to the Node B. Such a send buffer is therefore used in connection with HARQ processes in the Node B, in which the Node B combines two or more copies of the same packet, each copy possibly received in error, in order to correctly determine the packet that was actually sent. When a packet is successfully received by the Node B, i.e. when the Node B correctly determines the packet that was sent, possibly by combining copies, the UE removes the packet from its send buffer.

In case of HSUPA, the UTRAN (and in particular, e.g. the serving RNC, or possibly a Node B in communication with the UE) may from time to time determine that the UE send buffer should be flushed (i.e. that all packets should be removed) even though some packets have not been indicated as successfully received. (Usually, the UE determines that a packet has been successfully received because of not receiving a repeat request within a set period of time.)

Such HSUPA HARQ process flushing is required for example when performing reconfiguration, as part of the overall process of reconfiguration. A reconfiguration procedure can include reconfiguration of several different aspects of a communication link. For example, a reconfiguration procedure can include Data Description Indicator (DDI) reconfiguration. The DDI is a MAC-e (media access control-e) header field used to identify the logical channel, the MAC-d flow, and also the size of the MAC-d PDUs (protocol data units) concatenated into a MAC-es PDU. See e.g. the third generation partnership program (3GPP) technical specification (TS) 25.321 for a specification of DDI.

DDI reconfiguration re-maps the MAC-d flows, i.e. it reorganizes how data is to be mapped to the physical channels. The send buffer is maintained by the physical layer, i.e. the packets in the send buffer have already been passed to the physical layer. If reconfiguration including DDI reconfiguration is performed before HARQ process flushing, and there are still packets in the send buffer of the UE device, the re-mapping could interfere with transmission of these packets. On the other hand, if the reconfiguration does not involve re-mapping of MAC-d flows, etc., then it may be more advantageous to keep the retransmissions, i.e. not perform HARQ process flushing.

There is currently no method by which the UTRAN can signal to a UE to perform HSUPA HARQ process flushing.

What is needed therefore is a way for the UTRAN to indicate to the UE when to flush its send buffer, i.e. when to perform HSUPA HARQ process flushing.

DISCLOSURE OF INVENTION

In a first aspect of the invention, a method is provided comprising: a UE device parsing a message from a radio access network such as a UTRAN to determine whether a flag included in the message is set to indicate that the user equipment device is to flush one or more send buffers of the UE device holding packets for sending the packets to the radio access network; and the UE device flushing the one or more send buffers if the flag is set.

Correspondingly and according to at least some embodiments of the invention, a UE device is directed by the Node B of a UTRAN to perform HSUPA HARQ process flushing prior to a reconfiguration by the Node B including a flag in a message requiring reconfiguration. The flag indicates to the UE whether the UE is to perform HSUPA HARQ process flushing prior to the reconfiguration. Thus, the UTRAN (either the Node B or a more supervisory element, such as the RNC for the Node B) in effect flushes the UE HARQ processes whenever the UTRAN thinks HARQ flushing is necessary.

The invention thus provides a method by which a UE and a Node B of a UTRAN interface in respect to HARQ flushing, and more specifically a method in which a Node B communicates to the UE a reconfiguration message including a flag to indicate to the UE that it is to perform HARQ process flushing, and the UE receives the reconfiguration message, parses it to find the flag, and either performs HARQ process flushing or not, depending on how the flag is set. (The message including the flag is typically prepared by the serving RNC, but could also be prepared by any of the one or more Node Bs of the RNC.)

The invention also provides a UE device operative according to the method, and a UTRAN element (e.g. a Node B or RNC) operative according to the method, and also a system including a UE device and a UTRAN element, both operative according to the method.

A computer program product by which a UE is operative according to the method and a computer program by which a UTRAN element is operative according to the method are also provided. The invention also provides ASICs (application specific integrated circuits) corresponding to the computer program products.

BRIEF DESCRIPTION OF THE DRAWINGS

The above and other objects, features and advantages of the invention will become apparent from a consideration of the subsequent detailed description presented in connection with accompanying drawings, in which:

FIG. 3 is a data diagram showing signals communicated between the UE and the RAN of FIG. 1, according to the invention.

FIG. 4A is a reduced block diagram (only portions relevant to the invention being shown) of the UE terminal or the wireless terminal (Node B) of the RAN of FIG. 1.

FIG. 4B is a block diagram of components of the UE terminal of FIG. 1 related to the invention.

FIG. 4C is a block diagram of components of the RAN of FIG. 1 (components that could be located in either the RNC or the Node B).

BEST MODE FOR CARRYING OUT THE INVENTION

Figure 2:
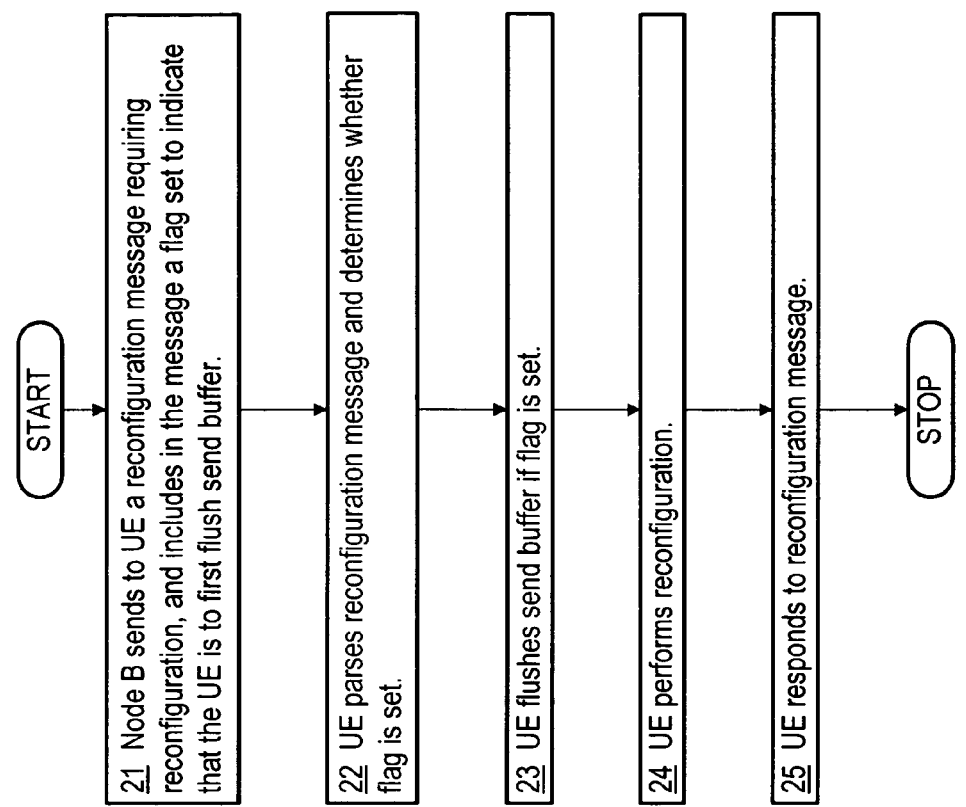
FIG. 2 is a flow chart of a method according to the invention.
Figure 1:
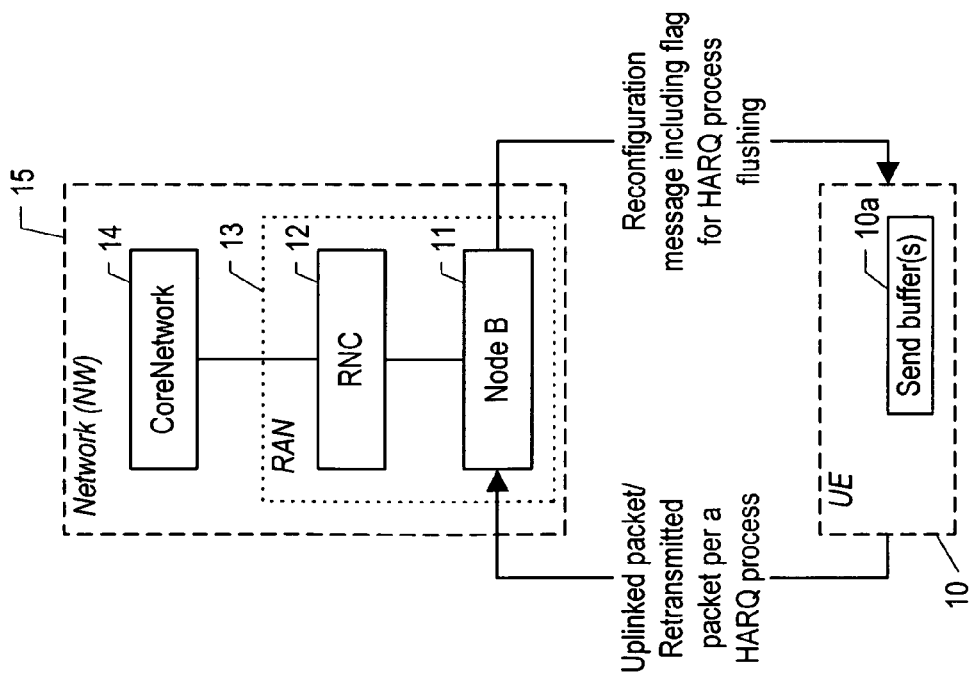
FIG. 1 is a block diagram/flow diagram of a UE receiving a message from a RAN including a radio network controller (RNC) and a Node B, the message indicating that the UE is to perform HARQ process flushing, according to the invention.

Referring now to FIGS. 1-3, a radio access network (RAN) 13 (e.g. a UTRAN) or other component of a wireless network (e.g. a UMTS) 15 is shown providing to a UE device 10 a message requiring that a reconfiguration procedure is to be performed, and indicates to the UE device that the UE is to flush a send buffer 10a holding packets for sending to the wireless network prior to performing the reconfiguration. The buffer flushing is communicated by including in the reconfiguration message a flag set to a value predetermined to signify that the send buffer is to be flushed. The flag, when set can signify that a single predetermined send buffer is to be flushed, or several predetermined send buffers.

The UE device 10 is e.g. a mobile phone or other wireless terminal, mobile or otherwise, and is communicatively coupled to the wireless network (via the radio access network). The reconfiguration is e.g. a DDI reconfiguration, or involves DDI reconfiguration or another reconfiguration in which MAC flows are re-mapped. The send buffer is e.g. a HARQ process buffer, and may hold packets for possible retransmission to the wireless network in case of the wireless network not successfully receiving the packets. The send buffer may also hold packets not already sent. (Packets are put in the buffer, and then sent immediately afterward, and so become sent packets almost as soon as they are put in the buffer.)

The wireless network 15 includes a core network 14 communicatively coupled to the RAN 13; the RAN includes one or more radio network controllers (RNCs) 12 each controlling one or more Node Bs 11, which are therefore wireless terminals, but of course quite different than wireless terminals serving as user equipment.

A DDI reconfiguration message is a particular example of a reconfiguration message that would convey a flag according to the invention, i.e. to indicate that a send buffer is to be flushed prior to performing the reconfiguration indicated by the message. (How the particular reconfiguration that is to be performed is indicated is outside the scope of the invention.)

The buffers are for example buffers used in HARQ processes for HSUPA, i.e. buffers used to hold packets for possible retransmission to one or more Node Bs to which the UE is communicatively coupled.

If the wireless network 15 decides to signal the UE 10 to perform a reconfiguration and to flush the send buffer 10a prior to doing so, then in a step 21 (FIG. 2) at least one of the Node Bs 11 to which the UE 10 is communicatively coupled (in UTRAN, a UE can be in simultaneous communication with more than one Node B, e.g. during a soft handover) sends an appropriate reconfiguration message including a flag indicating that the buffer flushing is to be performed (because the flag/bit is set). In a next step 22, the UE parses the message and determines whether the flag is set (i.e. has a value predetermined to indicate it is set, as opposed to not set). Typically, the flag is a single bit in a predetermined position in the message, and if it has a value of one it is interpreted by the UE as being set to indicate that buffer flushing is to be performed. In a next step 23, the UE flushes the send buffer if the flag is set. As illustrated in FIG. 3, the reconfiguration message can be a RRC (radio resource control) reconfiguration message as set out in technical specifications of 3GPP. In a next step 24, the reconfiguration is performed. In a next step 25, the UE sends a response to the reconfiguration message, confirming that the reconfiguration has been performed, including the buffer flushing.

In one embodiment of the invention, the message including the flag to reset the send buffer (or buffers) includes a so-called E-DCH (extended-dedicated channel) information element (IE), and according to the invention then also includes the flag that when set indicates that the send buffer is to be flushed. When set, the flag may be called a MAC-es/e reset indicator, since resetting the MAC-es/e entity results in flushing the send buffer used by HARQ processes. The MAC-es/e reset indicator is thus the (set) flag used by the invention, i.e. when the flag is set, it is a MAC-es/e reset indicator, and when it is not set (though it is still included in the message), it is not a MAC-es/e reset indicator. The MAC-es/e entity is made by the MAC layer of the protocol stack, i.e. the layer that controls which media (physical channels) are to be used in a communication. A layer above the MAC layer typically decides whether a MAC-es/e reset is to be performed.

FIG. 4A shows some components of a communication terminal 40, which could be either the UE terminal 10 or the RAN wireless terminal/Node B 11 of FIG. 1. The communication terminal includes a processor 42 for controlling operation of the device, including all input and output. The processor, whose speed/timing is regulated by a clock 42a, may include a BIOS (basic input/output system) or may include device handlers for controlling user audio and video input and output as well as user input from a keyboard. The BIOS/device handlers may also allow for input from and output to a network interface card. The BIOS and/or device handlers also provide for control of input and output to a transceiver (TRX) 46 via a TRX interface 45 including possibly one or more digital signal processors (DSPs), application specific integrated circuits (ASICs), and/or field programmable gate arrays (FPGAs). The TRX enables communication over the air with another similarly equipped communication terminal.

The RNC 12 of FIG. 1 typically includes the same components as shown in FIG. 4A, although usually not the TRX 46 and its interface 45, since a RNC usually communicates with a Node B using wireline communication.

Still referring to FIG. 4A, the communication terminal includes volatile memory, i.e. so-called executable memory 43 (where programs and data used by the programs reside during execution of the programs), and also non-volatile memory 44, i.e. storage memory. The processor 42 may copy applications (e.g. a calendar application or a game) stored in the non-volatile memory into the executable memory for execution. The processor functions according to an operating system, and to do so, the processor may load at least a portion of the operating system from the storage memory to the executable memory in order to activate a corresponding portion of the operating system. Other parts of the operating system, and in particular often at least a portion of the BIOS, may exist in the communication terminal as firmware, and are then not copied into executable memory in order to be executed. The booting up instructions are such a portion of the operating system.

Figure 5:
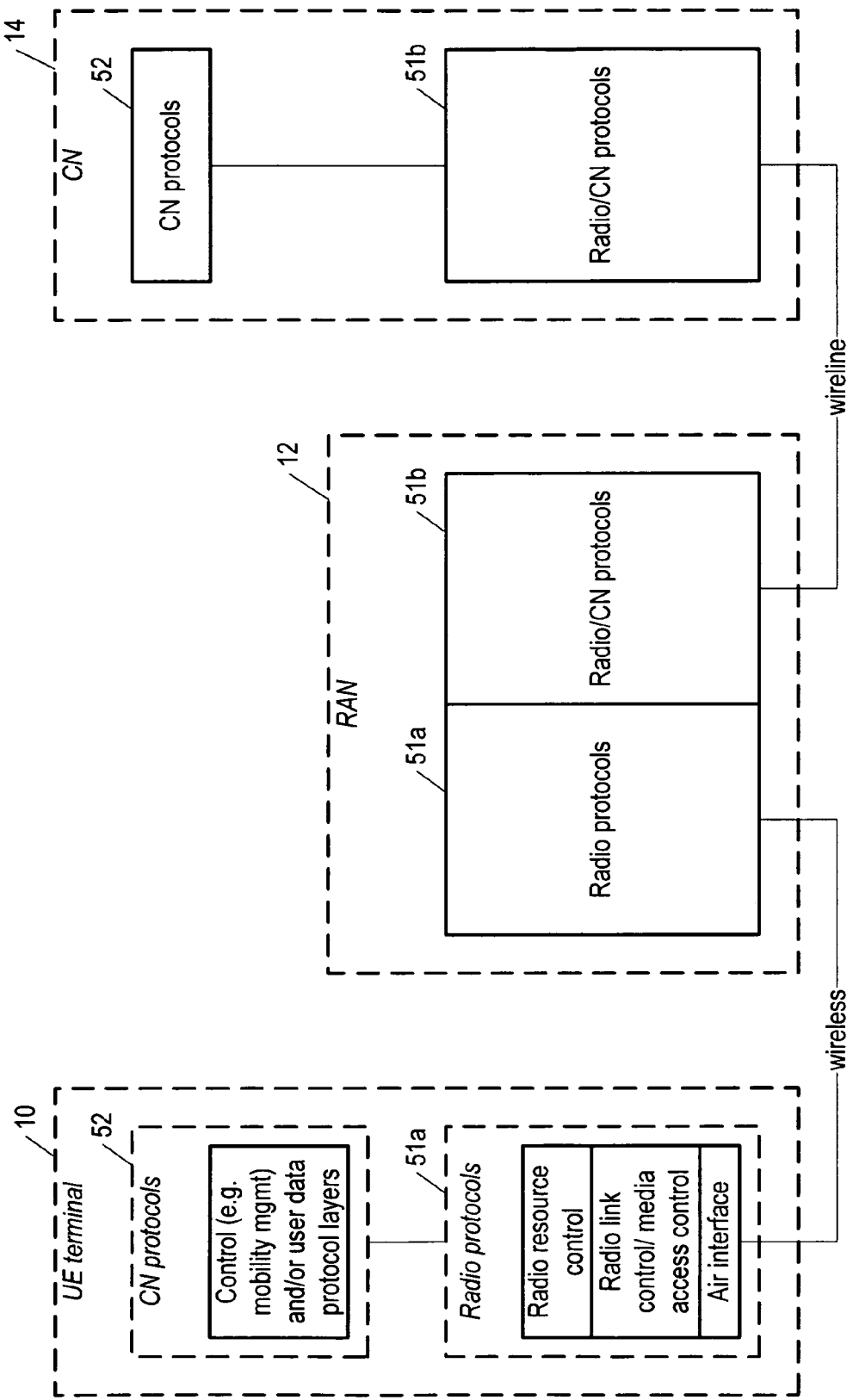
FIG. 5 is a reduced block diagram of two communications terminals of FIG. 1 in terms of a multi-layered communication protocol stack.

Referring now to FIG. 5, the wireless communication system (network 15 and user equipment 10) of FIG. 1 is shown from the perspective of layers of a protocol according to which communication is performed. The layers of protocol form a protocol stack, and include CN protocol layers 52 located in the UE 10 and CN 14, and radio protocol layers 51a located in the UE terminal 10 and in the RAN 13 (in either the RAN wireless terminal (Node B) 11 or the RAN controller (RNC) 12). Communication is peer-to-peer. Thus, a CN protocol layer in the UE communicates with a corresponding layer in the CN, and vice versa, and the communication is provided via lower/intervening layers. The lower/intervening layers thus provide as a service to the layer immediately above them in the protocol stack the packaging or unpackaging of a unit of communication (a control signal or user data).

The CN protocols typically include one or more control protocol layers and/or user data protocol layers (e.g. an application layer, i.e. the layer of the protocol stack that interfaces directly with applications, such as a calendar application or a game application).

The radio protocols typically include a radio resource control (protocol) layer, which has as its responsibilities, among quite a few others, the establishment, reconfiguration, and release of radio bearers. Another radio protocol layer is a radio link control/media access control layer (which may exist as two separate layers). This layer in effect provides an interface with the physical layer, another of the radio access protocol layers, and the layer that enables actual communication over the air interface.

The radio protocols are located in the UE terminal and in the RAN, but not the CN. Communication with the CN protocols in the CN is made possible by another protocol stack in the RAN, indicated as the radio/CN protocols stack. Communication between a layer in the radio/CN protocols stack and the radio protocols stack in the RAN may occur directly, rather than via intervening lower layers. There is, as shown in FIG. 5, a corresponding radio/CN protocols stack located in the CN, allowing then communication between the application level in the UE terminal and the application level in the CN.

Referring now to FIG. 4B, in a typical embodiment of the invention in connection with user equipment, the media access control layer element/functionality of the user equipment wireless communication device 10 (FIG. 1) includes a parsing component 10b for parsing the message from the radio access network including the flag (which may or may not be set to indicate flushing the one or more send buffers 10a). The parsing component parses the message to determine whether the flag is set. If it is, a buffer reset component 10c of the media access control layer flushes the one or more send buffers. The parsing component and buffer reset component may be implemented in hardware (e.g. as an ASIC) or software, and may be provided as, or as part of, one or more modules.

Referring now to FIG. 4C, in a typical embodiment of the invention in connection with equipment of a radio access network, the media access control layer element/functionality of either the RNC 12 or the Node 11 (depending on the implementation, but usually the RNC) includes a message preparing component 12a, for receiving from a higher layer of the protocol stack of the radio access network an indication that the UE device 10 is to flush the one or more send buffers holding packets for delivery to the radio access network element. In response, it prepares the message, for communication to the user equipment device, including the flag set to indicate that the user equipment device is to flush the one or more send buffers. The media access control layer also typically includes a message delivery component 12b of the media access control layer, responsive to the message, for providing the message for delivery to the user equipment device. These two components are typically located in the RNC 12, but could also be located in the Node B 11. The upper layer determining that a reset/buffer flush is to occur is located in the RNC. If the message preparing and delivery components are located in the RNC, the message provided by the RNC is communicated to the Node B, and from there to the user equipment device 10.

The functionality described above (for both the radio access network and the UE) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention provided as a computer program product including a computer readable storage structure embodying computer program code—i.e. the software—thereon for execution by a computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   a user equipment device parsing a message from a radio access network to determine whether a flag included in the message is set to indicate that the user equipment device is to flush one or more send buffers of the user equipment device holding packets for sending the packets to the radio access network; and
   the user equipment device flushing the one or more send buffers if the flag is set;
   wherein the message is a reconfiguration message and indicates that a reconfiguration is to be performed;
   wherein the flag is predetermined to convey that the flushing of the one or more send buffers is to be performed prior to the reconfiguration; and
   wherein the message includes an enhanced dedicated channel information element, and the flag is used to indicate that a MAC-es/e reset is to be performed by the user equipment device.

2. A method as in claim 1, wherein the send buffers are buffers used for high speed uplink packet access.

3. A computer program product comprising a computer readable storage structure embodying computer program code thereon for execution by a computer processor, wherein said computer program code comprises instructions for performing a method according to claim 1.

4. An application specific integrated circuit configured for operation according to claim 1.

5. A method, comprising:
- a radio access network element determining that a user equipment device is to flush one or more send buffers holding packets for delivery to the radio access network element;
- the radio access network element providing a message for communication to the user equipment device and including in the message a flag set to indicate that the user equipment device is to flush the one or more send buffers;
- wherein the message is a reconfiguration message and indicates that a reconfiguration is to be performed;
- wherein the flag is predetermined to convey that the flushing of the one or more send buffers is to be performed prior to the reconfiguration; and
- wherein the message includes an enhanced dedicated channel information element, and the flag is used to indicate that a MAC-es/e reset is to be performed by the user equipment device.

6. A method as in claim 5, wherein the send buffers are buffers used for high speed uplink packet access.

7. A computer program product comprising a computer readable storage structure embodying computer program code thereon for execution by a computer processor, wherein said computer program code comprises instructions for performing a method according to claim 5.

8. An application specific integrated circuit configured for operation according to claim 5.

9. An apparatus, comprising:
- a parsing component of a media access control layer of a user equipment wireless communication device, configured to parse a message from a radio access network to determine whether a flag included in the message is set to indicate that the user equipment device is to flush one or more send buffers of the user equipment device holding packets for sending the packets to the radio access network; and
- a buffer reset component of the media access control layer, configured to flush the one or more send buffers if the flag is set;
- wherein the message is a reconfiguration message and indicates that a reconfiguration is to be performed;
- wherein the flag is predetermined to convey that the flushing of the one or more send buffers is to be performed prior to the reconfiguration; and
- wherein the message includes an enhanced dedicated channel information element, and the flag is used to indicate that a MAC-es/e reset is to be performed by the user equipment device.

10. An apparatus as in claim 9, wherein the send buffers are buffers used for high speed uplink packet access.

11. An apparatus, comprising:
- means for parsing a message from a radio access network to determine whether a flag included in the message is set to indicate that a user equipment device is to flush one or more send buffers of the user equipment device holding packets for sending the packets to the radio access network; and
- means for flushing the one or more send buffers if the flag is set
- wherein the message is a reconfiguration message and indicates that a reconfiguration is to be performed;
- wherein the flag is predetermined to convey that the flushing of the one or more send buffers is to be performed prior to the reconfiguration; and
- wherein the message includes an enhanced dedicated channel information element, and the flag is used to indicate that a MAC-es/e reset is to be performed by the user equipment device.

12. An apparatus as in claim 11, wherein the send buffers are buffers used for high speed uplink packet access.

13. A user equipment wireless communication device, comprising:
- an apparatus as in claim 11;
- a receiver, for receiving the message via wireless communication, and for providing the message to the parsing component;
- one or more memory stores, for holding the one or more buffers; and
- a transmitter for wirelessly transmitting to the radio access network a reply to the message.

14. An apparatus, comprising:
- a message preparing component of a media access control layer of a radio access network, for receiving from a higher layer of a protocol stack of the radio access network an indication that a user equipment device in communication with the radio access network is to flush one or more send buffers holding packets for delivery to the radio access network element, and in response preparing a message for communication to the user equipment device and including in the message a flag set to indicate that the user equipment device is to flush the one or more send buffers; and
- a message delivery component of the media access control layer, responsive to the message, for providing the message for delivery to the user equipment device;
- wherein the message is a reconfiguration message and indicates that a reconfiguration is to be performed;
- wherein the flag is predetermined to convey that the flushing of the one or more send buffers is to be performed prior to the reconfiguration; and
- wherein the message includes an E-DCH information element, and the flag is used to indicate that a MAC-es/e reset is to be performed by the user equipment device.

15. An apparatus as in claim 14, wherein the send buffers are buffers used for high speed uplink packet access.

16. A radio network controller of a radio access network, comprising:
- an apparatus as in claim 14;
- wherein the radio network controller is configured to communicate to a wireless communication terminal of the radio access network the message for delivery to the user equipment device.

17. A wireless communication terminal of a radio access network, comprising:
- an apparatus as in claim 14;
- wherein the wireless communication terminal is configured to communicate to the message to the user equipment device.

18. An apparatus, comprising:
- means for receiving from a higher layer of a protocol stack of the radio access network an indication that a user equipment device in communication with the radio access network is to flush one or more send buffers holding packets for delivery to the radio access network element, and in response preparing a message for communication to the user equipment device and including in the message a flag set to indicate that the user equipment device is to flush the one or more send buffers; and means, responsive to the message, for providing the message for delivery to the user equipment device;

wherein the message is a reconfiguration message and indicates that a reconfiguration is to be performed;

wherein the flag is predetermined to convey that the flushing of the one or more send buffers is to be performed prior to the reconfiguration; and wherein the message includes an enhanced dedicated channel information element, and the flag is used to indicate that a MAC-es/e reset is to be performed by the user equipment device.

19. An apparatus as in claim 18, wherein the send buffers are buffers used for high speed uplink packet access.

\* \* \* \* \*